United States Patent [19]
Noll

[11] Patent Number: 5,315,305
[45] Date of Patent: May 24, 1994

[54] SCAN CONVERTER FOR A RADAR DISPLAY

[75] Inventor: John M. Noll, Boca Raton, Fla.

[73] Assignee: AlliedSignal Inc., Morris Township, Morris County, N.J.

[21] Appl. No.: 41,014

[22] Filed: Mar. 31, 1993

[51] Int. Cl.$^5$ .......................... G01S 7/04; H04N 7/01
[52] U.S. Cl. ..................................... 342/185; 342/195
[58] Field of Search ................................ 342/185, 195

[56] References Cited

U.S. PATENT DOCUMENTS

| | | | |
|---|---|---|---|
| 4,245,250 | 1/1981 | Tiemann | 342/185 X |
| 4,275,415 | 6/1981 | Engle | 342/185 |
| 4,656,467 | 4/1987 | Strolle | 342/185 X |
| 4,745,475 | 5/1988 | Bicknell | 342/185 X |
| 4,829,308 | 5/1989 | Tol et al. | 342/185 |
| 4,845,501 | 7/1989 | Pease et al. | 342/185 |

Primary Examiner—John B. Sotomayor
Attorney, Agent, or Firm—Howard G. Massung

[57] ABSTRACT

Radar data vectors of a desired number of pixels in length are scan converted, at a desired angular rate. A complete 360 degree radar data scan is maintained in memory. A raster image of a desired number of pixels in size and of arbitrary position and angular orientation with respect to the radar scan in memory is outputted. The resolution of the raster output image is varied to adjust its update rate. A high resolution, motion stabilizing radar display is provided and a multiresolution capability is available to eliminate image artifacts attributed to raster image update rate.

12 Claims, 5 Drawing Sheets

SCAN MEMORY

FRAME MEMORY

SCAN MEMORY

FRAME MEMORY

SCAN CONVERTER FOR A RADAR DISPLAY

BACKGROUND OF THE INVENTION

This invention relates generally to converting radar scan data vectors to a video display and, more particularly, to apparatus of the type described for use with a high resolution, motion stabilizing radar display having multiresolution display raster output capabilities for eliminating artifacts attributed to raster image update.

Current requirements for scan converters of the type contemplated include converting radar data vectors up to 960 pixels in length at an angular rate of 90 degrees per second. A complete 360 degree radar scan must be maintained in memory. Further, the apparatus must output approximately a 1024×1024 raster image of arbitrary position and angular orientation with respect to the radar scan maintained in memory, whereby motion stabilization is made possible.

Due to bandwidth limitations of vector address generators used in apparatus of the type described a raster image frame update rate is approximately 15 Hz, which is relatively slow. This produces undesirable scan artifacts during a first sweep, or when the scan data changes significantly from the previous sweep.

The present invention overcomes this disadvantage by incorporating multiresolution output features into the disclosed apparatus. More specifically, the resolution of the output image is reduced by one-half in both the horizontal and vertical directions. This reduced resolution mode of the invention increases the effective raster image frame update rate by almost four times, thereby eliminating all scan artifacts occurring from the aforenoted relatively slow raster image frame update rate.

It will be understood that the reduced resolution mode of the invention is intended to be used during any radar scan where previous raster image frame data is erased, or is significantly different than current data. Subsequent correlated scans are then displayed in full (high) resolution. The reduced resolution mode can also be used in any other case where current raster image frame data has significantly changed in orientation, position or content from the previous data.

SUMMARY OF THE INVENTION

This invention contemplates a scan converter for a radar display including a radar data scan memory. A vector address generator generates memory addresses of points along a vector defined using polar coordinate geometry. A raster image frame memory stores raster image lines sampled from the radar data scan memory. A system controller synchronizes access of both the scan and frame memories with the operation of the vector address generator. A video controller synchronizes the output of the raster image frame memory with a video display. A system overhead processor interprets commands and data from a host computer and maintains operation of the vector generator by loading vector definition parameters as needed.

DETAILED DESCRIPTION OF THE INVENTION

Figure 1:
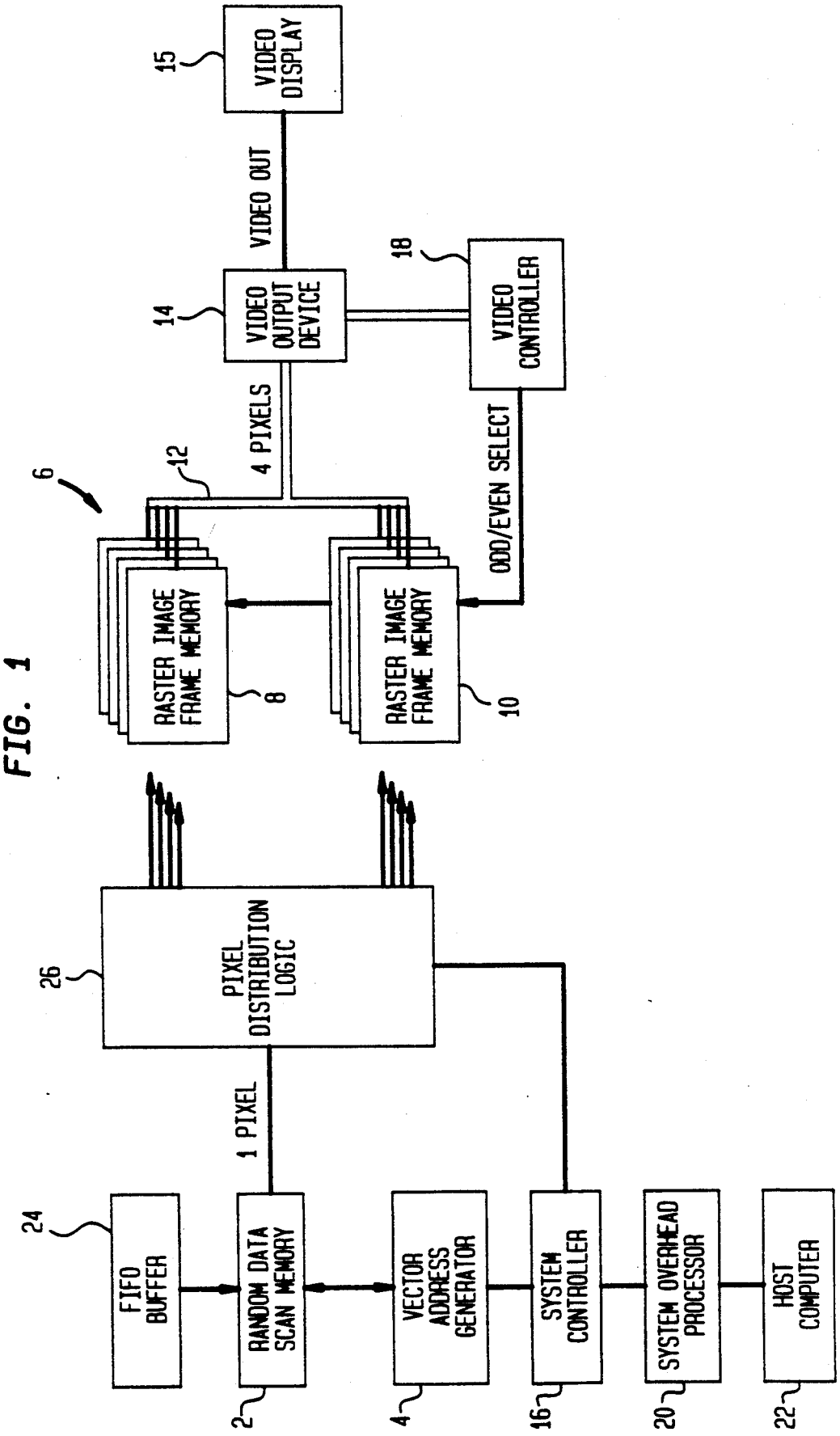
FIG. 1 is a block diagram generally illustrating the invention.

With reference first to FIG. 1, a radar data scan memory 2 is 2048×2048 pixels in size and is used to store radar data vectors up to 960 pixels in length and to maintain a complete 360 degree radar scan.

A vector address generator 4 generates the memory addresses of points along a vector defined using polar coordinate geometry. The spacing of consecutive points along the vector is variable. A memory address output from vector address generator 4 defines a pixel location in radar data scan memory 2 using cartesian coordinate geometry. Vector address generator 4 writes radar scan data into radar data scan memory 2 and also reads raster image lines from the radar data scan memory.

A raster image frame memory 6 is composed of memory components 8 and 10. Memory component 8 is 512 even lines×256 groups of 4 pixels. Memory component 10 is 512 odd lines×256 groups of 4 pixels. Raster image frame memory 6 is 1024×1024 pixels in size and is used to store raster image lines sampled from radar data scan memory 2. Raster image frame memory 6 is dual ported and permits write access of even raster lines, odd raster lines, and two lines at once. In a given line, raster image frame memory 6 permits write access of single pixels or pixel pairs. Any line and pixel write access combination is possible. When pixel pairs are written two lines at once, four pixels in the raster image frame memory are written simultaneously and are applied to a video output device 14 which applies a video out signal to a display video 15. Read access of raster image frame memory 6 is achieved by alternating odd and even lines with consecutive pixels of a given line, read four at a time.

A system controller 16 synchronizes the access of both radar data scan memory 2 and raster image frame memory 6, with the operation of vector address generator 4. System controller 16 supports the following raster image frame memory update modes: high resolution progressive scan, high resolution interlaced scan, and reduced resolution progressive scan.

A video controller 18 synchronizes the output of raster image frame memory 6 with the output of video output device 14. The display video format for display video 15 is 1024 lines progressive scan, at sixty frames per second.

A system overhead processor 20 interprets commands and data from a host computer 22 and maintains operation of vector address generator 4 by loading vector definition parameters as required.

In operation, system overhead processor 20 schedules radar data input vectors and raster output vectors in a time sharing fashion to meet a desired sweep rate requirement and to update raster image frame memory 6. Raster image resolution and its corresponding update rate is selected based on a predicted image frame correlation.

Radar data vector input is accomplished by loading vector address generator 4 with the origin coordinates, angle and length, of the desired vector. The addressed radar data scan memory locations are written with radar data supplied by a FIFO (first in—first out) buffer 24.

Figure 2A:
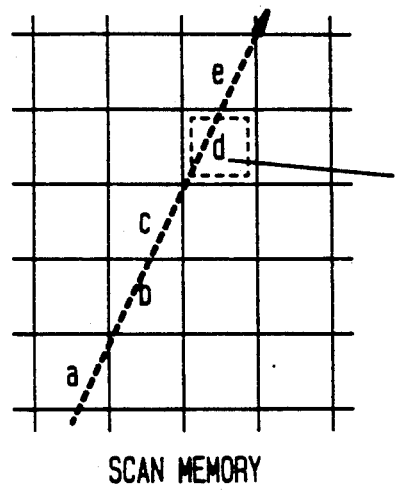
FIGS. 2A and 2B are graphical representations illustrating a high resolution frame memory update mode of the invention.
Figure 2B:
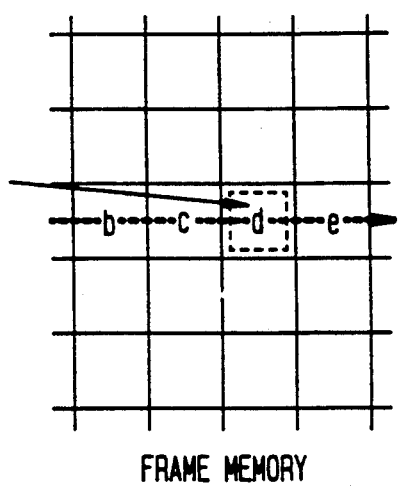

High resolution raster vector output is accomplished by loading vector address generator 4 with origin coordinates, angle and length of the desired vector. Single pixel stepping is selected to provide full resolution raster lines. The addressed radar data scan memory locations are read and moved to raster image frame memory 6 as single pixels a, b, c, d and e. Each raster output vector maps to a single raster line in raster image frame memory 6, giving full vertical resolution. In this regard, reference is made to FIGS. 2A and 2B.

Figure 3A:
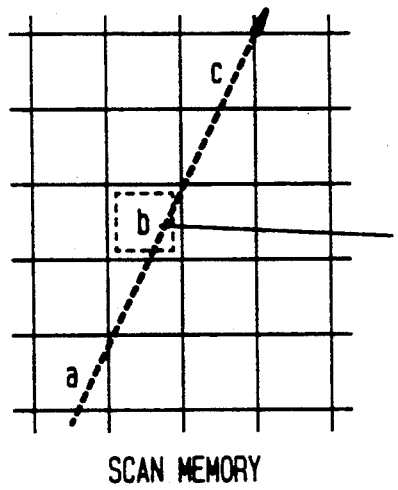
FIGS. 3A and 3B are graphical representations illustrating a reduced resolution frame memory update mode of the invention.
Figure 3B:
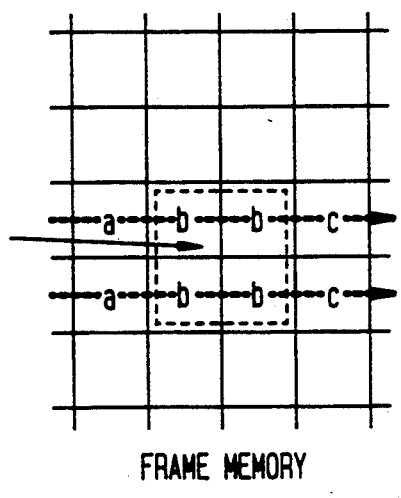
Figure 4:
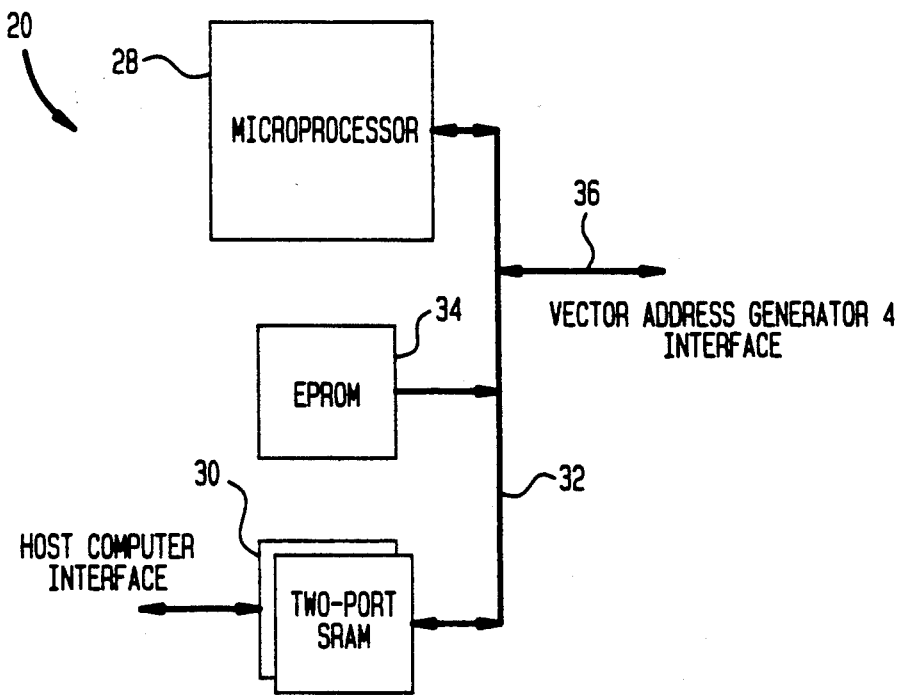
FIG. 4 is a block diagram more particularly illustrating system overhead processor 20 shown generally in FIG. 1.

Reduced resolution raster vector output is accomplished by loading vector address generator 4 with origin coordinates, angle and length of the desired vector. Double pixel stepping is selected to provide half resolution raster lines. The addressed radar data scan memory locations are read and moved to the raster image frame memory 6 as double pixels a, b, c and d. Each raster output vector maps two consecutive raster lines in raster image frame memory 6 giving half vertical resolution. In this regard, reference is made to FIGS. 3A and 3B.

The particular elements of the invention shown generally in FIG. 1 are shown more specifically in FIGS. 4–9 and will be next described with reference thereto.

System overhead processor 20 (FIG. 4) is configured to provide a 16 bit microprocessor system and includes a microprocessor 28 for the purpose of communicating with host computer 22 and for maintaining operation of vector address generator 4. A host computer interface is connected to a two port static random access memory (SRAM) 30. SRAM 30 is connected via an input/output line 32 to microprocessor 28. An erasable programmable read only memory (EPROM) 34 is connected to line 32 and is used for program storage. A vector address generator interface 36 is connected to line 32.

Vector address generator 4 (FIG. 5) is configured to provide a programmable address generator. Vector description data is loaded into X and Y offset registers 38 and 40, respectively and vector coordinates are provided as outputs. A digital synthesizer 42 is used as a polar-to-rectangular coordinate conversion engine. A scan radius stepper 44 is used to step the length of a vector from a vector length register 46. Inputs to digital synthesizer 42 are from scan radius stepper 44 and from a scan angle register 48. Controlling outputs from digital synthesizer 42 are applied to adders 50 and 52 which receive inputs from X offset register 38 and Y register 40, respectively, and which adders 50 and 52 provide X and Y addresses, respectively.

Radar data scan memory 2 (FIG. 6) is configured to provide a 2048×2048 element storage matrix with each element having a fixed depth to support a desired number of data values. The implementation is accomplished using sixteen one-megabit SRAMs such as 54 to provide a storage matrix four bits in depth as illustrated in the Figure.

Figure 7:
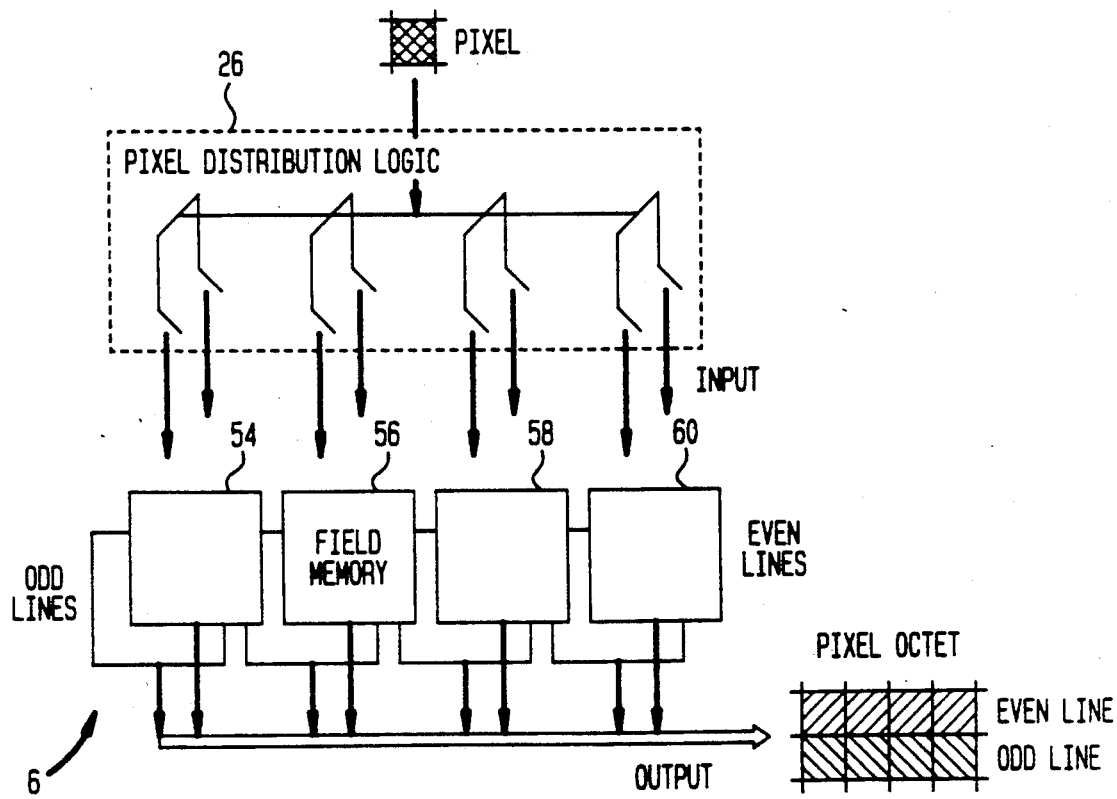
FIG. 7 is a diagrammatic representation more particularly illustrating raster frame memory 6 shown FIG. 1.

Raster image frame memory 6 (FIG. 7) is configured to form a raster display frame buffer having two independent serial access ports. One port services inputs to the memory and the other port services outputs therefrom. Inputs are controlled by pixel distribution logic 26 which is shown generally in FIG. 1 and more specifically in FIG. 7. The value of a single pixel is directed to one or more of the cells in a pixel group octet. As also shown in FIG. 7, an octet is comprised of four adjacent pixels and two adjacent lines. The output of the frame buffer is synchronized to video display 15 (FIG. 1). Pixels are read out, line by line, four pixels at a time. This feature is implemented using four even line field memories 54, 56, 58 and 60 and four odd line field memories 54A, 56A, 58A and 60A as two port serial access memories.

System controller 16 (FIG. 8) receives control information from system overhead processor 20 via control word registers 62. This implementation is configured using two system control state machines 64 and 66 receiving inputs from a system clock to control a fanout buffer 68. Fanout buffer 68 provides system control signals. High speed CMOS registers and buffers are used to condition the inputs and outputs. It will be understood that machines 64 and 66 function as one machine, but two such machines are required to implement the disclosed hardware form of the invention.

Video output device 14 (FIG. 9) uses a random access memory/digital-to-analog converter (RAMDAC) 70 to convert pixel data values from raster image frame memory 6 applied via a pixel bus to video output levels. A video control state machine 72 controls RAMDAC 70 and provides video synchronization and control logic. Video control state machine 72 clocks pixel values from the serial output port of the raster frame buffer. An internal counter (not otherwise shown) is used to select alternating odd and even lines from the buffer.

The elements of the invention generally shown in FIGS. 4–9 are implemented from commercially available components. For example, and with reference to FIG. 4, microprocessor 28 is a device of the type marketed by Analog Devices, Inc. under their trade designation AD2105-40; EPROM 34 is a device marketed by Advance Micro Devices, Inc. under their trade designation 27C64; and two port SRAM 30 is a device of the type marketed by Cypress Semiconductors, Inc. under their trade designation CY7C136.

Figure 5:
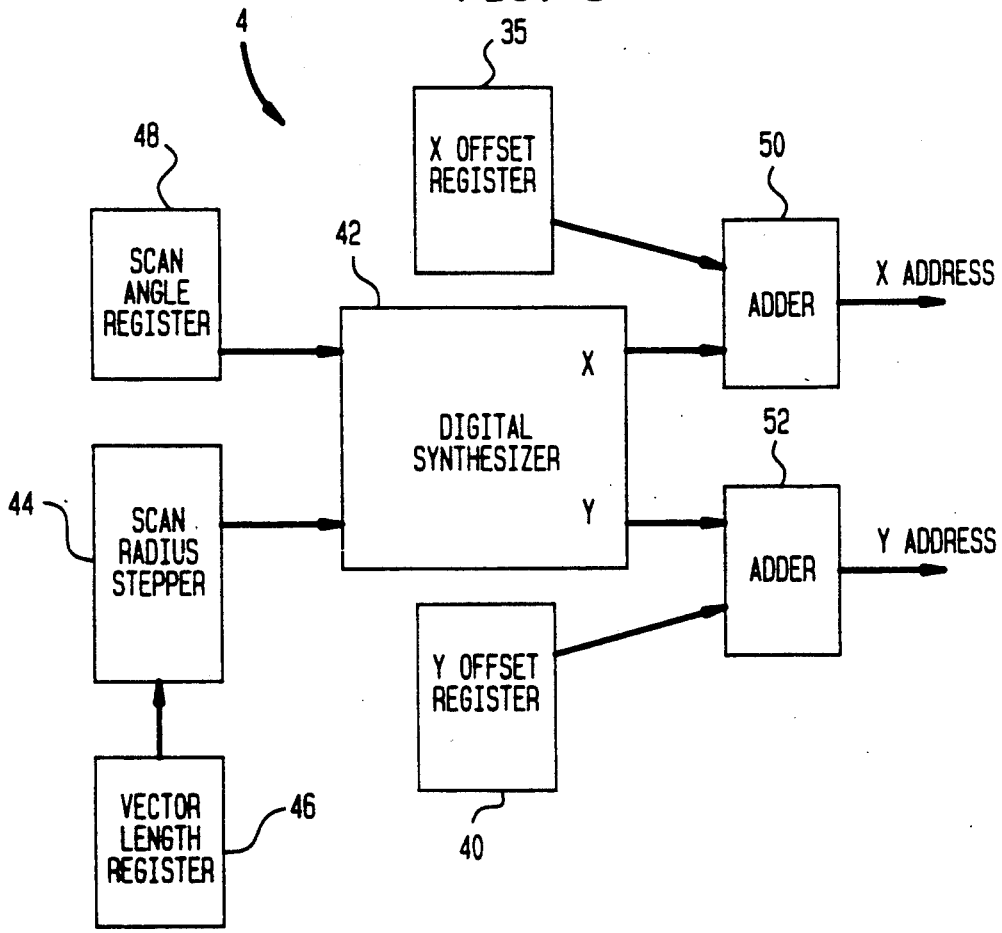
FIG. 5 is a block diagram more particularly illustrating vector address generator 4 shown generally in FIG. 1.

With reference to FIG. 5, digital synthesizer 42 is of the type marketed by the TRW Corporation under their trade designation TMC2340 and scan radius stepper 44 is a device marketed by Advanced Micro Devices, Inc. under their trade designation PALCE610.

Figure 6:
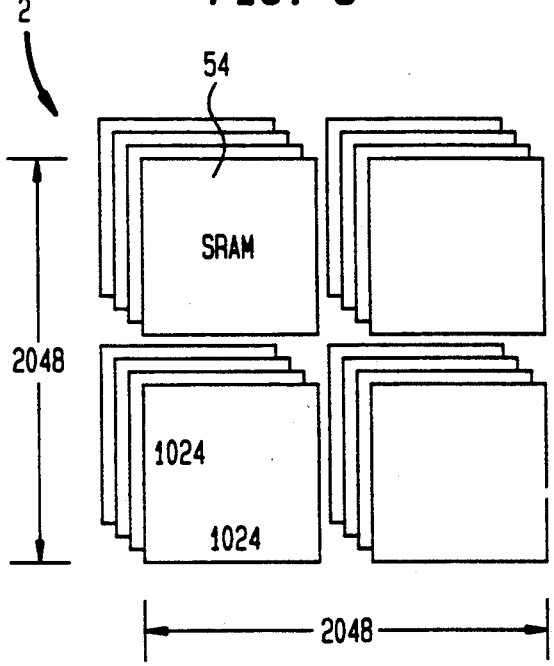
FIG. 6 is a diagrammatic representation more particularly illustrating radar data scan memory 2 shown generally in FIG. 1.

With reference to FIG. 6, the one megabit SRAMs 2 are devices of the type marketed by Micro Technology, Inc. under their trade designation MT5C1001-25.

With reference to FIG. 7, field memories 54–60 are of the type manufactured by Texas Instruments Corp. under their trade designation TMS4C1050-30. Pixel distribution logic 26 is a device marketed by Advanced Micro Devices, Inc. under their trade designation PALCE610.

Figure 8:
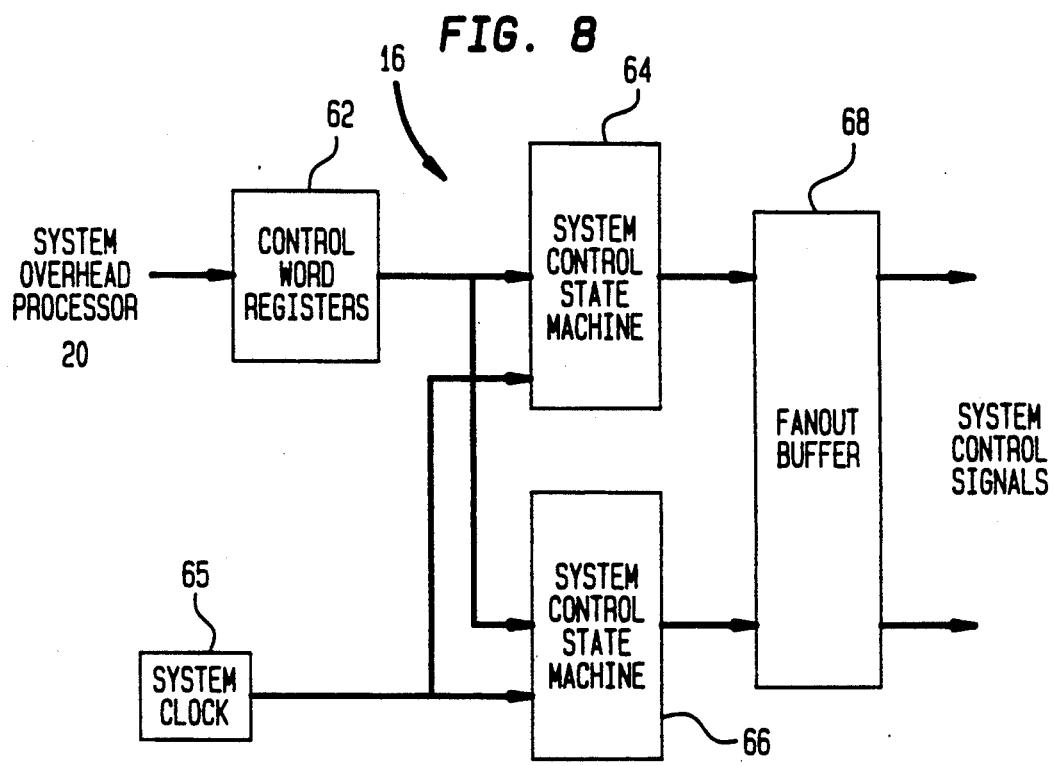
FIG. 8 is a block diagram more particularly illustrating system controller 16 shown generally in FIG. 1.

With reference to FIG. 8, system control state machines 64 and 66 are likewise devices marketed by Advanced Micro Devices Corp. under their trade designation EP610.

Figure 9:
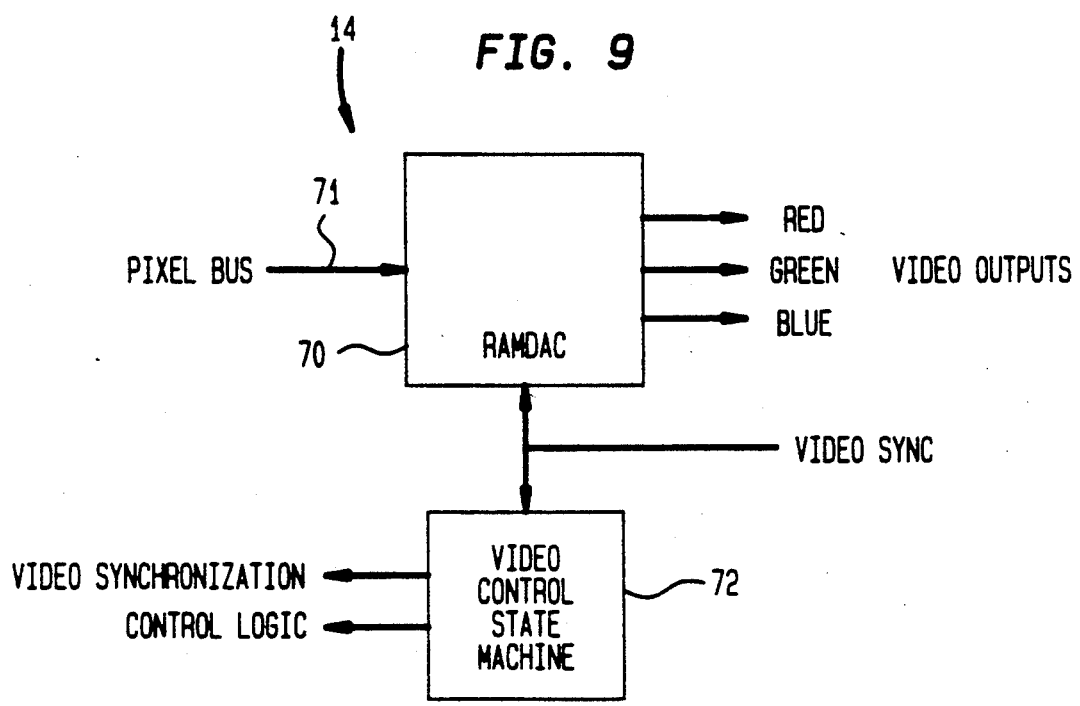
FIG. 9 is a block diagram more particularly illustrating video output device 14 shown generally in FIG. 1.

With reference to FIG. 9, RAMDAC 70 is a device of the type marketed by Texas Instruments, Inc. under their trade designation TLC34075 and video control state machine 72 is a device marketed by Advanced Micro Devices, Inc. under their trade designation PAL-CE610.

Accordingly, the invention resides not in the components themselves but in the arrangements thereof.

There has thus been described a scan converter for a radar display which converts radar data vectors up to 960 pixels in length at an angular length of up to ninety degrees per second. The converter maintains a complete 360 degree radar data scanning memory and outputs a 1024×1024 raster image of arbitrary position and angular orientation with respect to the radar scanning memory. The device can also vary the resolution of the raster output image to adjust its update rate.

With the above description of the invention in mind, reference is made to the claims appended hereto for a definition of the scope of the invention.

I claim:

1. A scan converter for a radar display comprising:
    radar data scan memory means for storing radar data vectors;
    vector address generator means using polar coordinate geometry for generating memory addresses of points along a defined radar data vector with the spacing of consecutive memory address points along said vector being variable, said vector address generator means providing a memory address output defining a pixel location in the radar data scan memory means using cartesian coordinate geometry, and said vector address generator means arranged to write radar scan data into the radar data scan memory means and to read raster image lines therefrom;
    raster image frame memory means for storing raster image lines related to radar data vectors sampled from the radar data scan memory means;
    controller means for synchronizing access of both the radar data scan memory means and the raster image frame memory means with the generation of memory addresses of points along the defined vector by the vector address generator means;
    video controller means for controlling the raster image frame memory means for providing a pixel output and for synchronizing said pixel output with a video display means; and
    processor means for interpreting commands and data from a host device, and for maintaining the generation of memory addresses of points along the defined radar data vector generated by the vector address generator by loading vector definitions parameters therein.

2. A scan converter as described by claim 1, wherein:
    the radar data scan memory means is 2048×2048 pixels in size and is arranged to store radar data vectors up to 960 pixels in length, and to maintain a complete 360 degree radar scan.

3. A scan converter as described by claim 1 wherein the raster image frame memory means includes:
    first and second memory components;
    the first memory component having 512 even lines, and 256 groups of four pixels;
    the second memory component having 512 odd lines, and 256 groups of four pixels;
    the raster image frame memory thereupon being 1024×1024 pixels in size; and
    said raster image frame memory means arranged to permit write access of even raster lines, odd raster lines and two lines at once, and in a given line said raster image frame memory means being arranged to permit write access of single pixels and pixel pairs.

4. A scan converter as described by claim 3, wherein:
    the raster image frame memory means in arranged to permit any line and pixel write access combination for application to the video display means.

5. A scan converter as described by claim 3, wherein:
    the raster image frame memory is arranged so that read access thereof is achieved when the odd and the even raster lines are alternated with consecutive pixels of a given line, read four at a time.

6. A scan converter as described by claim 1, wherein:
    the raster image frame memory means has two serial access ports;
    one of said two ports being effective for applying pixel inputs to the raster image frame memory means, and the other of said two ports being effective for providing pixel outputs therefrom; and
    pixel distribution logic means for controlling pixel inputs to said raster image frame memory means.

7. A scan converting method for a radar display, comprising:
    storing radar data vectors;
    generating memory addresses of points along a defined radar data vector;
    generating said memory address points using polar coordinate geometry;
    variably spacing consecutive memory address points;
    defining a pixel location using cartesian coordinates;
    writing radar scan data based on the generated, variably spaced consecutive memory address points;
    reading raster image lines from the written scan data;
    storing raster image lines related to the stored radar data vectors;
    synchronizing access of the stored radar data vectors and the stored raster image lines with the generation of the memory addresses of the points along the defined radar vector;
    controlling the access of the stored raster image lines related to the vector data vectors for providing a pixel output;
    synchronizing the pixel output with a video display;
    interpreting commands and data from a host device; and
    maintaining the generation of memory addresses of points along the defined radar vector by providing vector definition parameters required for generating said memory address points.

8. A scan converting method as described by claim 7, including:
    storing radar data vectors up to 960 pixels in length.

9. A scan converting method as described by claim 7, including:
    maintaining a complete 360 degree radar scan.

10. A scan converting method as described by claim 7, including:
    permitting write access of even raster lines, odd raster lines, and two lines at once; and
    permitting write access of single pixels and pixel pairs.

11. A scan converting method as described by claim 10, including:
    permitting any line and pixel combination; and
    video displaying said combination.

12. A scan converting method as described by claim 10, wherein:
    reading the raster image lines when odd and even lines are alternated with consecutive pixels of a given line, read four at a time.

* * * * *